United States Patent
Kasai et al.

(10) Patent No.: US 8,804,183 B2
(45) Date of Patent: Aug. 12, 2014

(54) RECORDING CONTROL DEVICE, RECORDING APPARATUS, METHOD OF CONTROLLING RECORDING APPARATUS, AND RECORDING MEDIUM

(75) Inventors: Yuichiro Kasai, Suwa (JP); Toshiaki Koike, Shiojiri (JP); Takashi Saikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 599 days.

(21) Appl. No.: 12/944,630

(22) Filed: Nov. 11, 2010

(65) Prior Publication Data

US 2011/0109941 A1    May 12, 2011

(30) Foreign Application Priority Data

Nov. 11, 2009   (JP) .................................. 2009-258073

(51) Int. Cl.
   *G06K 15/00*   (2006.01)
   *G06F 3/12*    (2006.01)
(52) U.S. Cl.
   USPC .......................................... 358/1.16; 358/1.1
(58) Field of Classification Search
   None
   See application file for complete search history.

(56) References Cited

U.S. PATENT DOCUMENTS 5,745,255 A * 4/1998 Yamaguchi .................. 358/1.15
5,781,707 A   7/1998 Kunz et al.
2003/0193535 A1* 10/2003 Nakayama et al. ............... 347/5

FOREIGN PATENT DOCUMENTS

| EP | 0 821 319 A2 | 1/1998 |
| JP | 62-016977 A | 1/1987 |
| JP | 62-169677 A | 7/1987 |
| JP | 63-141779 A | 6/1988 |
| JP | 03-290269 A | 12/1991 |
| JP | 08-183226 A | 7/1996 |
| JP | 09-011530 A | 1/1997 |
| JP | 10-000824 A | 1/1998 |
| JP | 2001-191591 A | 7/2001 |
| JP | 2001-205855 A | 7/2001 |
| JP | 2003-231332 A | 8/2003 |

* cited by examiner

*Primary Examiner* — Marcus T Riley

(57) ABSTRACT

A recording control device controls a recording mechanism section which performs recording on a recording medium by a recording head. An image expansion section expands data input from the outside to create image data for recording. An image buffer memory temporarily stores the image data created by the image expansion section. A recording control section reads the image data stored in the image buffer memory, and controls the recording mechanism section to record the read image data on the recording medium by the recording head. The recording control section controls a recording speed of the recording mechanism section on the basis of a creation speed of the image data in the image expansion section.

10 Claims, 6 Drawing Sheets

RECORDING CONTROL DEVICE, RECORDING APPARATUS, METHOD OF CONTROLLING RECORDING APPARATUS, AND RECORDING MEDIUM

The disclosure of Japanese Patent Application No. 2009-258073 filed on Nov. 11, 2009, including specification, drawings and claims are incorporated herein by reference in its entirety.

BACKGROUND

The present invention relates to a recording control device which changes a recording speed, a recording apparatus having the recording control device, a method of controlling a recording apparatus, and a recording medium.

There is known an apparatus, such as a printer, which performs recording on the basis of data input from an apparatus, such as a host computer, at a variable recording speed. A printing apparatus described in Patent Document 1 includes a buffer memory which stores data input from a host system. In this printing apparatus, when the quantity of data in the buffer memory is small, the printing speed decreases to decrease the data reading speed in the memory. Thus, an interruption of printing due to an insufficient quantity of data is avoided. Similarly, in order to prevent an interruption of printing, a printer described in Patent Document 2 is configured such that, if the quantity of unprinted data in the buffer memory decreases, the printing speed is slowed down. A printing apparatus described in Patent Document 3 is configured such that, if the quantity of data in the buffer memory becomes equal to or smaller than a predetermined amount, the printing speed decreases. A printing apparatus described in Patent Document 4 controls the operation speed of a sheet transport motor on the basis of the number of lines of printing data received in a line unit. A printer described in Patent Document 5 is configured such that, if a quantity of drawing data which is printable at high speed is accumulated, the printing speed increases at high speed. A printer described in Patent Document 6 is configured such that the printing speed changes depending on the number of storage areas in a printing waiting state where image data is stored.

Patent Document 1: JP-A-62-169677
Patent Document 2: JP-A-2003-231332
Patent Document 3: JP-A-62-169677
Patent Document 4: JP-A-2001-205855
Patent Document 5: JP-A-2001-191591
Patent Document 6: JP-A-9-11530

Meanwhile, in the above-described recording apparatus, even when a sufficient quantity of data is supplied from an external apparatus, if data processing is not finished on time inside the apparatus, the recording operation may be interrupted due to shortage of data. For example, when high-load processing, such as letter decoration, is performed inside the recording apparatus, data for recording is insufficient regardless of the input state of data from the external apparatus, and it is likely to cause an interruption of the operation. If the storage capacity of the buffer memory is small, even when the quantity of data in the buffer memory is sufficient, a high data reading speed may cause depletion of data. For this reason, in adjusting the printing speed to an appropriate level, it is necessary to read data after increasing the storage capacity of the buffer memory and sufficiently accommodating data in the buffer memory.

SUMMARY

It is therefore an object of at least one embodiment of the present invention to prevent depletion of data for recording and to continue a stable recording operation in a recording apparatus which records data input from an external apparatus.

In order to achieve at least one of the above-described objects, according to a first aspect of the embodiments of the present invention, there is provided a recording control device that controls a recording mechanism section which performs recording on a recording medium by a recording head, the recording control device comprising: an image expansion section that expands data input from the outside to create image data for recording; an image buffer memory that temporarily stores the image data created by the image expansion section; and a recording control section that reads the image data stored in the image buffer memory, and controls the recording mechanism section to record the read image data on the recording medium by the recording head, wherein the recording control section controls a recording speed of the recording mechanism section on the basis of a creation speed of the image data in the image expansion section.

With this configuration, the recording speed of the recording mechanism section is controlled on the basis of the creation speed when data input from the outside is expanded to create image data for recording. Thus, it is possible to harmonize the speed of processing related to the expansion of data which is likely to be high-load processing and the speed of recording based on expanded image data and to prevent interruption of the recording operation due to depletion of image data. The creation speed of image data reflects both the input speed of data from the outside and the speed of expansion processing of data. Thus, if the recording speed is controlled on the basis of the creation speed of image data, it is possible to reliably prevent interruption of the recording operation. Since the recording speed is controlled on the basis of the speed of expansion of image data, there is little limitation on the capacity of the buffer memory, and the recording speed can be appropriately controlled.

In the recording control device according to the first aspect, the image expansion section may create the image data and output the created image data to the image buffer memory in a prescribed job unit, and the recording control section may control the recording speed of the recording mechanism section on the basis of a time interval at which jobs are output from the image expansion section to the image buffer memory.

In this case, image data created by the image expansion section is output to the image buffer memory in the prescribed job unit, and the recording speed is controlled on the basis of the interval between the jobs. Thus, the processing speed of image expansion is detected easily and accurately, and the recording speed is controlled appropriately in accordance with the speed. Therefore, it is possible to continue a stable recording operation.

In the recording control device according to the first aspect, each time a job is output from the image expansion section to the image buffer memory, the recording control section may obtain a time interval between a time at which a previous job is output and a time at which the job is output and control the recording speed of the recording mechanism section at the time of recording of the job on the basis of the time interval.

In this case, the recording speed of a job to be recorded immediately after is controlled on the basis of the interval between the jobs. Therefore, it is possible to constantly maintain the recording speed at the optimum speed and to continue a stable recording operation.

In the recording control device according to the first aspect, when the recording control section increases or decreases the recording speed of the recording mechanism section at the time of recording of the job by a predetermined amount or more with respect to the recording speed of the recording mechanism section at the time of recording of the previous job, the recording control section may increase or decrease the recording speed of the recording control section at the time of recording of the previous job.

In this case, when the recording speed significantly increases or decreases by the predetermined amount or more, the recording speed of the previous job increases or decreases. Thus, it is possible to prevent an extreme increase or decrease of the recording speed. Therefore, it is possible to continue a more stable recording operation and to improve recording quality.

In the recording control device according to the first aspect, the image expansion section may output the created image data to the image buffer memory in units of a job corresponding to at least one row or at least one dot line to be recorded by the recording mechanism section.

In this case, image data is output in units of a job corresponding to one row of letters (characters) or one dot line of a graphic (image) to be recorded on the recording medium, and the recording speed is controlled on the basis of the interval between the jobs. Thus, the recording speed is adjusted meticulously, making it possible to continue a stable recording operation. In this case, several rows or several dot lines may be used as a unit insofar as an appropriate speed is obtained.

According to a second aspect of the embodiments of the present invention, there is provided a recording apparatus comprising: a recording mechanism section having a recording head which performs recording on a recording medium; an image expansion section that expands data input from the outside to create image data for recording; an image buffer memory that temporarily stores the image data created by the image expansion section; and a recording control section that reads the image data stored in the image buffer memory, and controls the recording mechanism section to record the read image data on the recording medium by the recording head, wherein the recording control section controls a recording speed of the recording mechanism section on the basis of a creation speed of the image data in the image expansion section.

With this recording apparatus, the recording speed of the recording mechanism section is controlled on the basis of the creation speed when data input from the outside is expanded to create image data for recording. Thus, it is possible to harmonize the speed of processing related to the expansion of data which is likely to be high-load processing and the speed of recording based on expanded image data and to prevent interruption of the recording operation due to depletion of image data. The creation speed of image data reflects both the input speed of data from the outside and the speed of expansion processing of data. Thus, if the recording speed is controlled on the basis of the creation speed of image data, it is possible to reliably prevent interruption of the recording operation.

According to a third aspect of the embodiments of the present invention, there is provided a method of controlling a recording apparatus that controls a recording mechanism section which performs recording on a recording medium by a recording head, the method comprising: expanding data input from the outside to create image data for recording; temporarily storing the created image data in an image buffer memory; reading the image data stored in the image buffer memory; recording the read image data on the recording medium by the recording head; and controlling a recording speed of the recording mechanism section on the basis of a creation speed of the created image data in the creating.

With this control method, the recording apparatus is controlled, such that the recording speed of the recording mechanism section is controlled on the basis of the creation speed when data input from the outside is expanded to create image data for recording. Thus, it is possible to harmonize the speed of processing related to the expansion of data which is likely to be high-load processing and the speed of recording based on expanded image data and to prevent interruption of the recording operation due to depletion of image data. The creation speed of image data reflects both the input speed of data from the outside and the speed of expansion processing of data. Thus, if the recording speed is controlled on the basis of the creation speed of image data, it is possible to reliably prevent interruption of the recording operation. Since the recording speed is controlled on the basis of the speed of expansion of image data, there is little limitation on the capacity of the buffer memory, and the recording speed can be appropriately controlled.

According to a fourth aspect of the embodiments of the present invention, there is provided a computer-readable recording medium that records a program therein, the program causing a controller for controlling a recording mechanism section which performs recording on a recording medium by a recording head to execute the method according to the third aspect.

The program is executed by the controller, such that the recording speed of the recording mechanism section is controlled on the basis of the creation speed when data input from outside the recording apparatus is expanded to create image data for recording. Thus, it is possible to harmonize the speed of processing related to the expansion of data which is likely to be high-load processing and the speed of recording based on expanded image data and to prevent interruption of the recording operation due to the expansion processing of data being unfinished on time. The creation speed of image data reflects both the input speed of data from the outside and the speed of expansion processing of data. Thus, if the recording speed is controlled on the basis of the creation speed of image data, it is possible to reliably prevent interruption of the recording operation. Since the recording speed is controlled on the basis of the speed of expansion of image data, there is little limitation on the capacity of the buffer memory, and the recording speed can be appropriately controlled.

According to the aspects of the invention, the recording speed is appropriately controlled on the basis of the creation speed when input data is expanded to create image data for recording. Therefore, it is possible to prevent interruption of the recording operation due to depletion of image data and to continue a stable recording operation.

DETAILED DESCRIPTION OF THE EMBODIMENTS

Hereinafter, an embodiment of the invention will be described with reference to the drawings.

Figure 1:
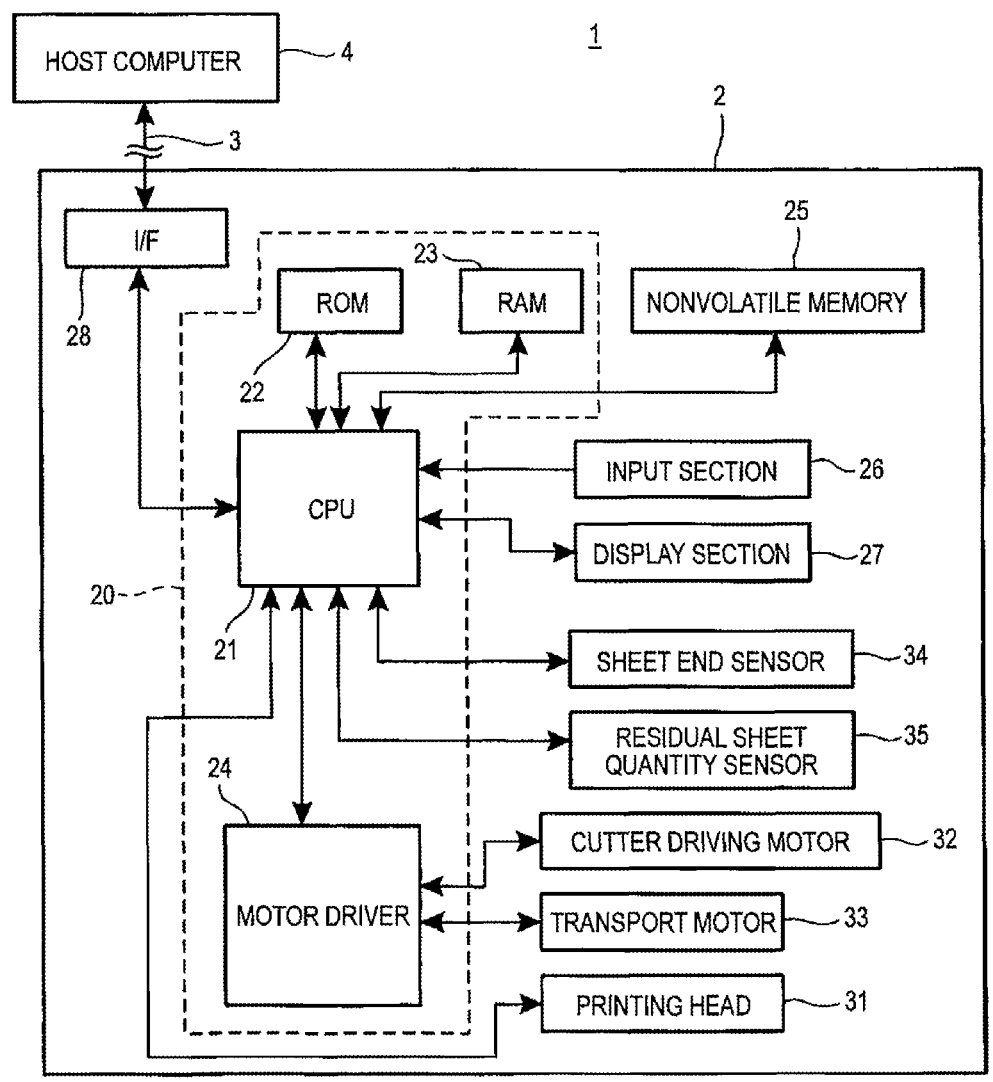
FIG. 1 is a block diagram showing the configuration of a printing system according to an embodiment.

FIG. 1 is a block diagram showing the circuit configuration of a printer 2 to which the invention is applied.

The printer 2 serving as a recording apparatus described in this embodiment is an apparatus in which a thermal roll sheet serving as a recording medium is accommodated in a main body (not shown) thereof, and a printing head 31 having a heat generation element applies heat to the recording surface of the thermal roll sheet to print (record) letters (characters) or images (graphics). The printer 2 is connected to a host computer 4 through a communication line 3, and receives control data or data for printing from the host computer 4. The communication line 3 is constituted by, for example, a communication cable, such as a serial interface based on the RS-232C standard or a parallel interface based on the IEEE 1284 standard, or a wired or wireless near-field communication line, such as Ethernet (Registered Trademark) or a wireless LAN. With regard to the communication line 3, the host computer 4 may be provided at a location remote from the printer 2, and a public circuit network or a mobile communication network may be used.

The printer 2 includes a control section 20 which performs overall control of the entire printer 2, and respective sections which operate under the control of the control section 20. The control section 20 includes a CPU 21 which performs control by executing a predetermined program and processing various kinds of data, a ROM 22 which stores a basic control program to be executed by the CPU 21, a RAM 23 which forms a work area temporarily storing a program to be executed by the CPU 21 or data to be processed, and a motor driver 24 which drives a motor or the like under the control of the CPU 21. A nonvolatile memory 25 is connected to the CPU 21. The nonvolatile memory 25 stores the control program to be executed by the CPU 21 or data to be processed in a nonvolatile manner. Specifically, the nonvolatile memory 25 is constituted by a semiconductor memory element, such as an EEPROM or a flash memory.

A cutter driving motor 32 and a transport motor 33 are connected to the motor driver 24. The cutter driving motor 32 drives a cutter unit (not shown) provided in the vicinity of the discharge port of the thermal roll sheet to cut the thermal roll sheet. The transport motor 33 rotates a roller platen (not shown) to transport the thermal roll sheet. The motor driver 24, the transport motor 33 which is controlled by the motor driver 24, and the printing head 31 serving as a recording head which is controlled by the CPU 21 constitute a recording mechanism section.

A sheet feed switch (not shown) and an LED display are provided in the main body of the printer 2. The sheet feed switch is provided to instruct the feed operation of the thermal roll sheet. The LED display is provided to display the operation state of the printer 2. An input section 26 and a display 27 are connected to the CPU 21. The input section 26 detects a manipulation of the sheet feed switch. The display 27 controls the LED display to perform various kinds of display.

The printer 2 also includes a sheet end sensor 34 which detects the presence/absence of the thermal roll sheet on the transport path of the thermal roll sheet, and a residual sheet quantity sensor 35 which detects that the residual quantity of the thermal roll sheet is equal to or smaller than a predetermined amount, and an interface 28.

The cutter driving motor 32 and the transport motor 33 are connected to the motor driver 24. The motor driver 24 supplies a driving current and controls a voltage with respect to each heat generation element (not shown) of the printing head 31 to cause color production of the recording surface of the thermal roll sheet. The motor driver 24 supplies driving power and outputs a required number of driving pulses with respect to the cutter driving motor 32 and the transport motor 33 constituted by, for example, a stepping motor. The thermal roll sheet is transported by the roller platen which is rotated by the transport motor 33 and cut by the cutter unit which is driven by the cutter driving motor 32.

The CPU 21 controls a head driver (not shown) connected to the printing head 31 on the basis of data input from the host computer 4 through the interface 28 while monitoring the position of the thermal roll sheet and the residual quantity of the thermal roll sheet detected by the sheet end sensor 34 and the residual sheet quantity sensor 35. The CPU 21 operates the cutter driving motor 32 and the transport motor 33 through the motor driver 24 to perform printing on the thermal roll sheet. When the manipulation of the sheet feed switch is detected by the input section 26, the CPU 21 operates the transport motor 33 to transport the thermal roll sheet by a predetermined amount. The CPU 21 changes the lighting state of each LED of the LED display through the display 27 in accordance with the operation state of the printer 2, or the like.

The interface 28 is connected to the host computer 4 through the communication line 3. The interface 28 controls transmission and reception of data with respect to the host computer 4, and stores data (including a command) received from the host computer 4 in a receiving buffer 201.

Figure 2:
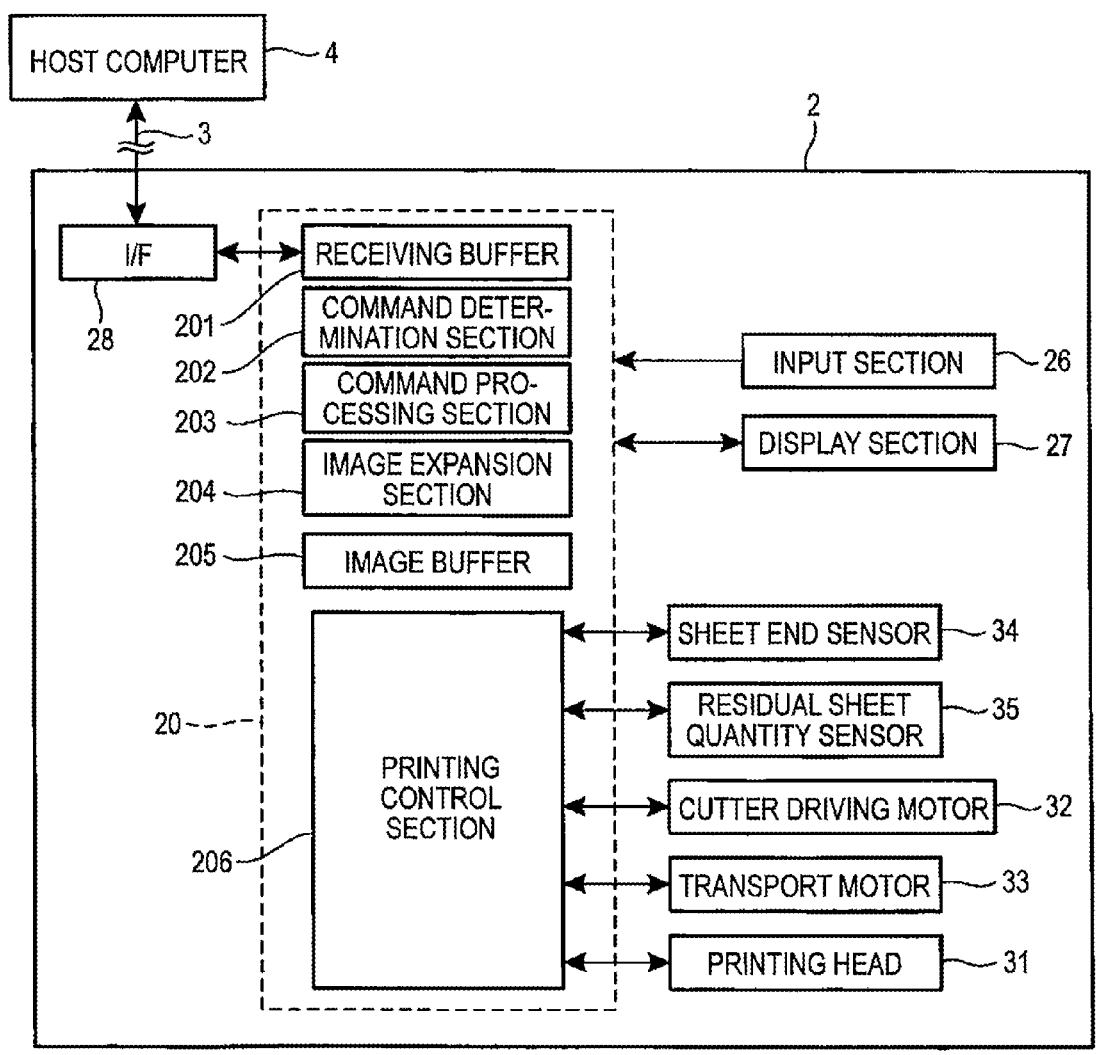
FIG. 2 is a functional block diagram of a printer.

FIG. 2 is a functional block diagram showing the functional configuration of the printer 2. Each functional block shown in FIG. 2 refers to a function which is realized by hardware of each section of the printer 2 shown in FIG. 1 or cooperation between hardware and software.

The control section 20 has a receiving buffer 201 which temporarily stores a command or data received from the host computer 4 through the interface 28, a command determination section 202 which detects a command stored in the receiving buffer 201 and determines the type or content of the command, a command processing section 203 which performs processing in accordance with the command detected by the command determination section 202, an image expansion section 204 which expands data for printing stored in the receiving buffer 201 in accordance with the command detected by the command determination section 202 to create image data to be printed on the thermal roll sheet, an image buffer 205 (image buffer memory) which temporarily stores image data created by the image expansion section 204, and a printing control section 206 (recording control section) which reads image data from the image buffer 205 and causes image data to be printed on the thermal roll sheet.

The receiving buffer 201 is a volatile memory which is constituted by the RAM 23 (FIG. 1). The receiving buffer 201 stores data received through the interface 28 in a received order without differentiating between commands and data.

The command determination section 202 references data stored in the receiving buffer 201 in order from the head, and determines whether or not each piece of data is a command. That is, the command determination section 202 detects a command from data stored in the receiving buffer 201.

When a command detected from the receiving buffer 201 is a command other than printing execution, the command determination section 202 outputs, to the command processing section 203, information indicating that a command is detected. When a detected command is a printing command which instructs printing execution, the command determination section 202 outputs, to the image expansion section 204, information indicating that a command is detected.

A command which is transmitted from the host computer 4 may be accompanied by data to be processed. For example, when a printing mode or the like is set in the printer 2, a function setting command and data representing the setting content are transmitted from the host computer 4, received by the interface 28, and stored in the receiving buffer 201. When the host computer 4 instructs printing execution, printing data is transmitted from the host computer 4 after a printing command and stored in the receiving buffer 201.

The command processing section 203 reads a command detected by the command determination section 202 from the receiving buffer 201, and executes the command.

Figure 3:
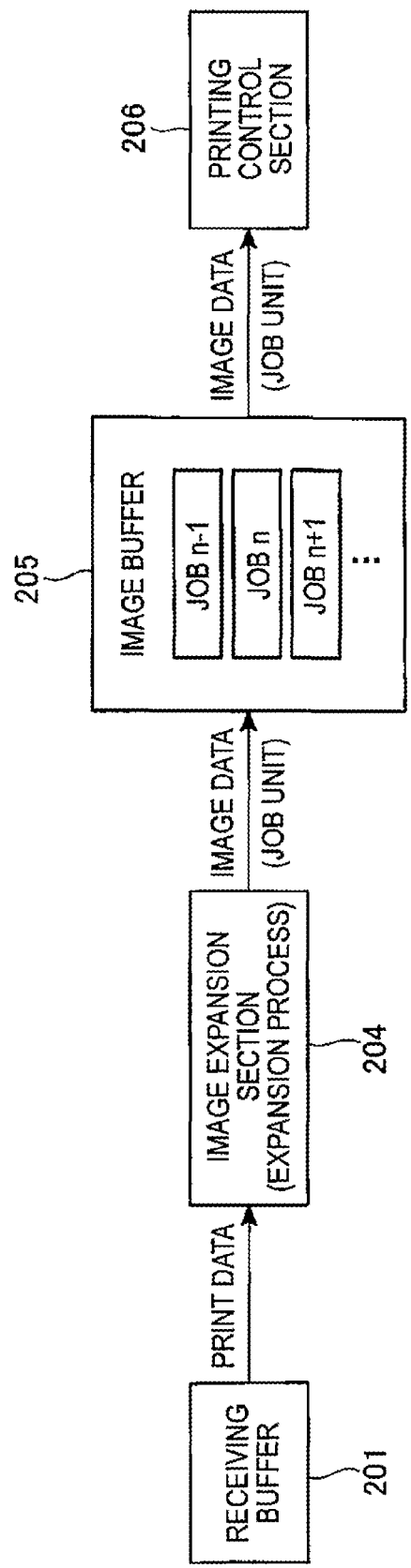
FIG. 3 is an explanatory view showing an aspect of processing of image data in the printer.

FIG. 3 is an explanatory view showing an aspect of processing of image data in the printer 2. FIG. 3 schematically shows transfer of data between the image expansion section 204, the image buffer 205, and the printing control section 206.

The image expansion section 204 reads the printing command detected by the command determination section 202 and printing data received after the printing command from the receiving buffer 201, and expands printing data to create image data. Image data which is created by the image expansion section 204 is data which is in the form of being formed on the thermal roll sheet, and a printing image includes all of letters, images, and other objects. As shown in FIG. 3, the image expansion section 204 creates image data in a job unit of a predetermined size and sequentially outputs image data to the image buffer 205, such that image data is stored in the image buffer 205.

One job corresponds to one row in the case of image data of letters, and corresponds to one dot line in the case of image data of an image. When the number of dots of the printing head 31 is 24 dots, image data of an image is created with data of 24 dots as one job. When an inter-row space is 6 dots, one job may be created for 30 dots in accordance with the number of dots of the printing head 31. The image expansion section 204 creates image data corresponding to one job and outputs image data to the image buffer 205 in the created order.

The image buffer 205 is a nonvolatile memory. The image buffer 205 stores image data input in a job unit from the image expansion section 204 in the input order.

The printing control section 206 controls the printing head 31, the transport motor 33, and the cutter driving motor 32 on the basis of the detection values of the sheet end sensor 34 and the residual sheet quantity sensor 35 to print image data on the thermal roll sheet. As shown in FIG. 3, the printing control section 206 reads image data stored in the image buffer 205 in a job unit in an order stored in the image buffer 205, and causes image data to be printed on the thermal roll sheet.

The image buffer 205 is a memory having a so-called FIFO structure. The printing control section 206 reads image data in the image buffer 205 in the stored order, that is, from the oldest image data. Image data read by the printing control section 206 is erased from the image buffer 205 as printed data. For this reason, latest image data to be printed is stored in the image buffer 205 in a job unit.

The printing control section 206 of this embodiment is configured to change the printing speed.

The printing speed refers to the transport speed of the thermal roll sheet by the transport motor 33 during printing. For example, the printing speed is expressed as the transport amount of the thermal roll sheet per second, that is, 200 mm/second, 80 mm/second, or the like.

The printing control section 206 reads image data from the image buffer 205 at a speed according to the printing speed. In other words, image data in the image buffer 205 is consumed (read) in accordance with the printing speed. For this reason, if the speed at which the image expansion section 204 creates image data and outputs image data to the image buffer 205 falls below the speed at which image data is consumed, image data of the image buffer 205 is depleted, and it is necessary that the printing control section 206 interrupts the printing operation. In order to prevent the interruption of the printing operation, the printing control section 206 detects a speed at which the image expansion section 204 creates image data on the basis of a timing at which the image expansion section 204 outputs image data to the image buffer 205, and determines the printing speed in accordance with the speed.

Figure 4:
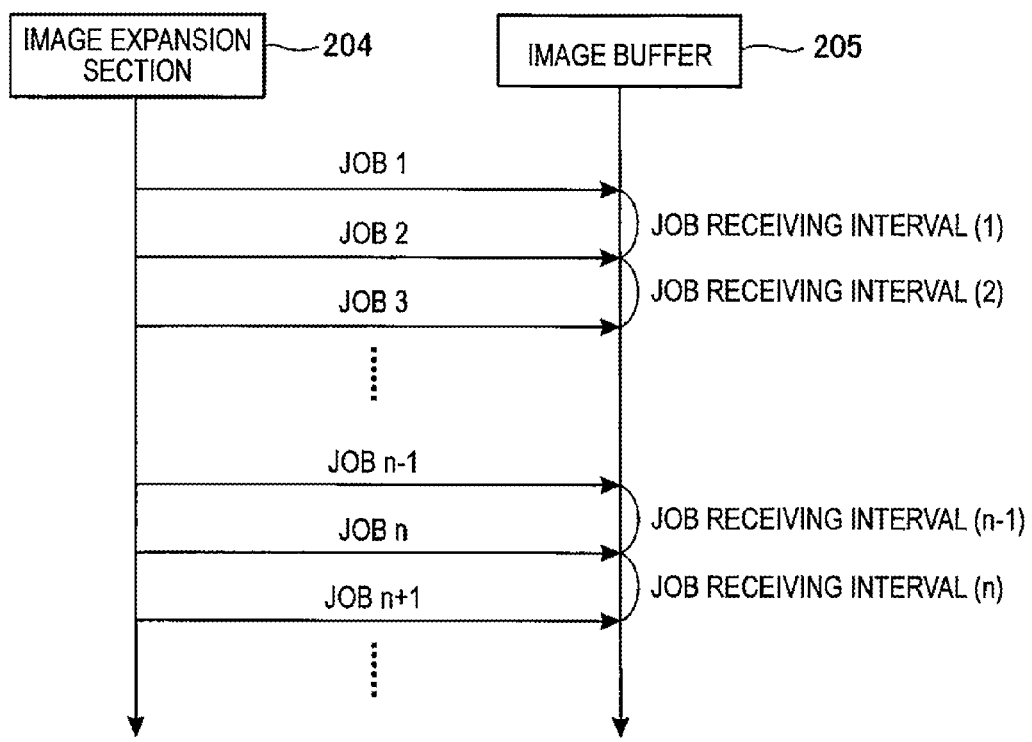
FIG. 4 is an explanatory view showing processing related to detection of a creation speed of image data.

FIG. 4 is an explanatory view of processing related to detection of a speed at which the image expansion section 204 creates image data. In particular, FIG. 4 shows an aspect where image data is output to the image buffer 205.

The image expansion section 204 expands data read from the receiving buffer 201 to create image data and outputs image data to the image buffer 205 in a job unit. The printing control section 206 measures a time (in the drawing, a job receiving interval) between jobs input to the image buffer 205, and holds the job receiving interval in relation to the job.

For example, as shown in FIG. 4, when a job 1, a job 2, . . . , a job (n−1), a job n, a job (n+1), . . . are input to the image buffer 205, the printing control section 206 holds an interval of input timing between the job 1 and the job 2 to the image buffer 205 as a job receiving interval (1) in relation to the job 2. Similarly, the interval between the job 2 and the job 3 is held as a job receiving interval (2). Subsequently, the interval between the job (n−1) and the job n is held as a job receiving interval (n−1), and the interval between the job n and the job (n+1) is held as a job receiving interval (n). The job receiving interval (n) is related to the job (n+1).

Data constituting a job is determined in advance as one row of characters or one dot line of a graphic. For this reason, the shorter the job receiving interval, the higher the image data creation speed of the image expansion section 204. Therefore, the printing control section 206 determines the printing speed on the basis of the length of the job receiving interval.

That is, the printing control section 206 compares the job receiving interval (1) with a multiple-stage threshold value set in advance, obtains a printing speed corresponding to a range to which the job receiving interval (1) belongs, and determines the printing speed as the printing speed when the job 2 is printed. Subsequently, the printing control section 206 determines the printing speed when the job 3 is printed on the basis of the job receiving interval (2), and determines the printing speed when the job (n+1) is printed on the basis of the job receiving interval (n). In this case, each time a job is received, the job receiving interval is obtained, and the printing speed when the relevant job is printed is set on the basis of the job receiving interval. Therefore, it is possible to control the printing speed meticulously, reliably preventing depletion of image data in the image buffer 205 and performing stable printing.

Figure 5:
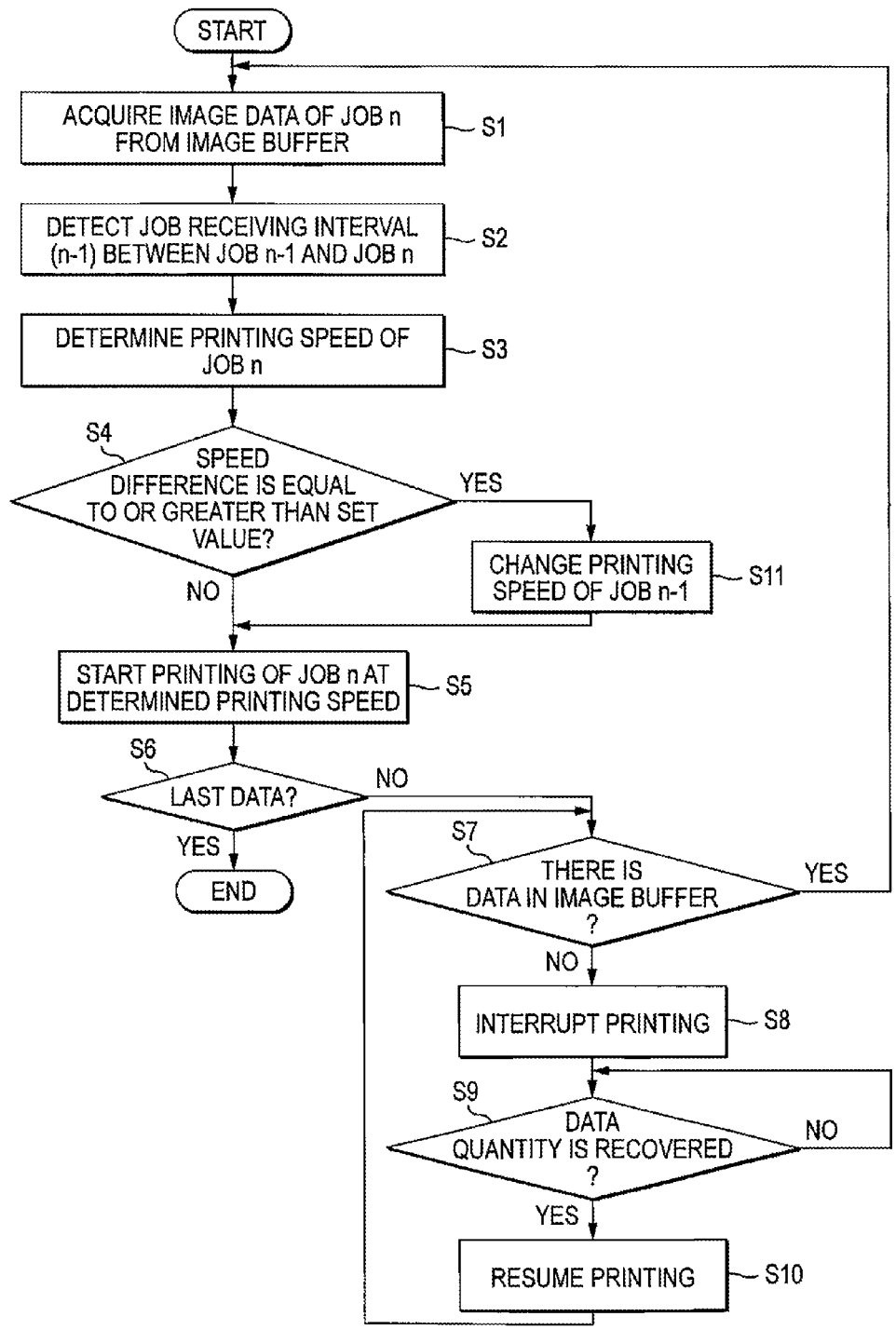
FIG. 5 is a flowchart showing the operation of the printer.

FIG. 5 is a flowchart showing the operation of the printer 2. FIG. 5 shows operations concerning the setting of the printing speed and the printing operation.

The control section 20 of the printer 2 acquires image data of the leading job n from image data stored in the image buffer 205 (Step S1). Next, the control section 20 acquires the job receiving interval (n−1) between acquired image data of the job n and image data of the previous job (n−1) (Step S2). The printing control section 206 constantly detects an input of image data to the image buffer 205, and obtains and holds the job receiving interval each time image data is input. Thus, in Step S2, the control section 20 acquires the job receiving interval (n−1) which has already been held.

The control section 20 determines the printing speed when image data of the job n is printed on the basis of the acquired job receiving interval (n−1) (Step S3), and determines whether or not the determined printing speed has a speed difference which exceeds a set value with respect to the printing speed of the previous job (n−1) (Step S4).

When there is no speed difference which exceeds the set value between the printing speed of the job n and the printing speed of the job (n−1) (Step S4: No), the control section 20 starts printing of image data of the job n at the determined printing speed (Step S5). The control section 20 determines whether or not image data of the job n is the last image data to be printed after printing has started (Step S6). When image data of the job n is the last image data (Step S6: Yes), this processing ends after image data of the job n has been printed.

Meanwhile, when image data of the job n being printed is not the last image data (Step S6: No), the control section 20 determines whether or not there is image data of the next job (n+1) in the image buffer 205 (Step S7).

When there is no image data of the next job in the image buffer 205 (Step S7: No), the control section 20 interrupts the printing operation once when printing of image data of the job being executed has ended (Step S8), and waits until the quantity of image data stored in the image buffer 205 is recovered to a predetermined amount (for example, equal to or greater than one job) (Step S9: No). After the quantity of image data is recovered (Step S9: Yes), the printing operation is resumed (Step S10), and the process returns to Step S7. In Step S8, the printing operation may be interrupted while image data of one job is being printed.

When image data of the next job is stored in the image buffer 205 (Step S7: Yes), the control section 20 returns to Step S1 to acquire image data of the next job and to print image data.

When there is a speed difference which exceeds the set value between the printing speed of the job n and the printing speed of the job (n−1) (Step S4: Yes), the control section 20 changes the printing speed of the previous job (n−1) before printing of the job n starts (Step S11). The printing speed may be changed while the job (n−1) is being printed. After the printing speed has been changed and the job (n−1) has been printed, the control section 20 progresses to Step S5 to start printing the job n.

The set value or the threshold value used in the operation shown in FIG. 5 is set by, for example, a command received from the host computer 4 and stored in the ROM 22 or the RAM 23.

Figure 6A:
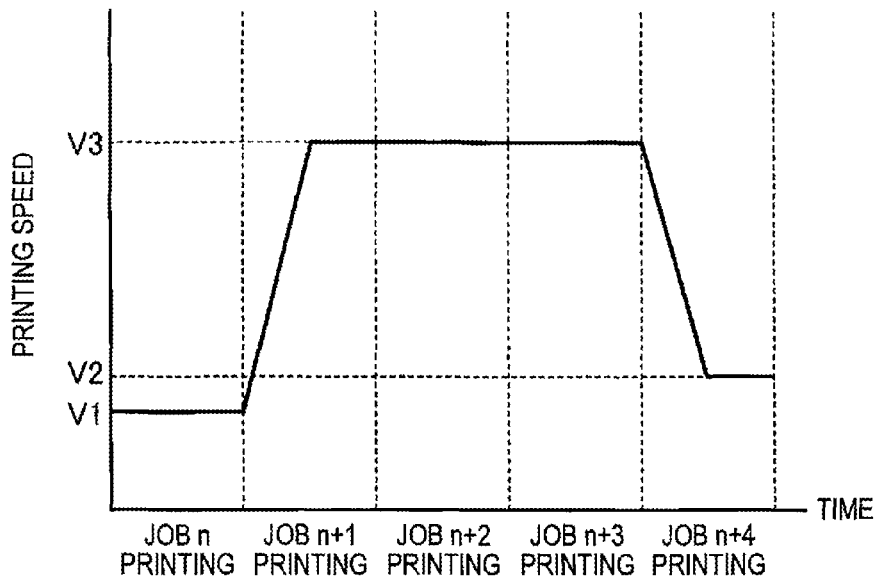
FIGS. 6A and 6B are diagrams showing an example of changes in a printing speed.
Figure 6B:
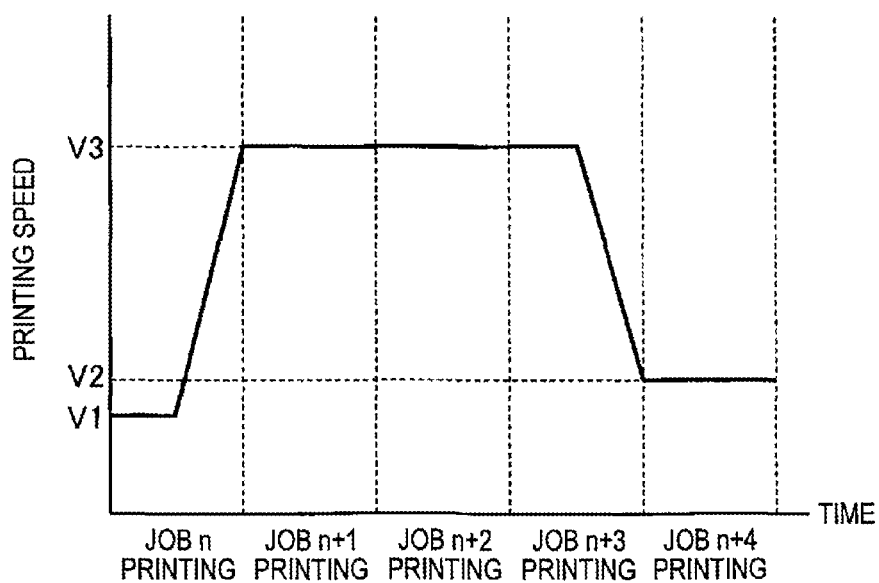

FIGS. 6A and 6B are diagrams showing an example of changes in the printing speed.

As described above, although the control section 20 determines the printing speed on the basis of the job receiving interval with respect to the previous job, when the printing speed increases or decreases, it is necessary to provide an acceleration period or a deceleration period. For this reason, it is impossible to immediately switch the printing speed to the determined printing speed.

In an example of FIG. 6A, the job n is printed at a printing speed V1, and the next job (n+1) is printed at a printing speed V3. In this case, it takes time to accelerate the printing speed from the printing speed V1 to the printing speed V3. Thus, in practice, acceleration starts from when printing of the job (n+1) starts, and after the printing speed reaches the speed V3 while the job (n+1) is being printed, the printing speed V3 is held. That is, in the example of FIG. 6A, the acceleration necessary for realizing the printing speed of the job (n+1) is performed while the job (n+1) is being printed.

Similarly, when it is necessary to decelerate the printing speed, in the example of FIG. 6A, the printing speed V2 of the job (n+4) is at a significantly low speed compared to the printing speed V3 of the job (n+3), and it is necessary to provide a long deceleration period. In this case, deceleration is performed after printing of the job (n+3) has been completed, and after the printing speed reaches the determined printing speed V2 while the job (n+4) is being printed, then, printing is performed at the printing speed V2 to the end of the job (n+4).

As described above, the control section 20 performs acceleration/deceleration to the printing speed of the job n after printing of the job n starts. For this reason, while the effect of changing the printing speed to a high speed or to a low speed is diminished slightly, the time necessary for printing is changed in accordance with the speed at which the image expansion section 204 creates image data, preventing depletion of image data. The printing speed can be increased within a range which does not exceed the creation speed of the image data, improving throughput.

In the printer 2 of this embodiment, when the printing speed of image data of the job is changed from the printing speed of the previous job so as to exceed the set value through the processing described in Step S11 of FIG. 5, it is possible to change the speed while the previous job is being printed.

In an example of FIG. 6B, when the job n is printed at the printing speed V1, and the next job (n+1) is printed at the printing speed V3, acceleration starts while the job n is being printed. For this reason, acceleration is completed when printing of the job (n+1) starts or immediately after printing starts, and printing is performed substantially at the determined printing speed V3 while the job (n+1) is being printed. When the job (n+3) is printed at the printing speed V3, and the next job (n+4) is printed at a lower printing speed V2, deceleration starts while the job (n+3) is being printed. For this reason, deceleration is completed when printing of the job (n+4) starts or immediately after printing starts. As described above, when significant acceleration/deceleration of the printing speed is necessary, acceleration/deceleration of the printing speed starts while the previous job is being printed, such that the printing speed is quickly changed to the determined printing speed. Therefore, when the creation speed of image data of the image expansion section 204 is changed, the consumption speed of image data is rapidly changed in accordance with the change. When there is a margin in the creation speed of image data, the printing speed increases, improving throughput. The printing speed is controlled so as not to exceed the creation speed of image data, preventing interruption of the printing operation and performing stable printing.

As shown in FIGS. 6A and 6B, the printing speed is changed linearly. For this reason, there is no rapid change in the printing speed, preventing deterioration of printing quality.

As described above, with the printer 2 according to the embodiment to which the invention is applied, the control section 20 which controls the printer 2 performing printing on the thermal roll sheet by the printing head 31 includes the image expansion section 204 which expands data input from the host computer 4 to create image data for printing, the image buffer 205 which temporarily stores image data created by the image expansion section 204, and the printing control section 206 which reads image data stored in the image buffer 205 and causes image data to be printed on the thermal roll sheet by the printing head 31. The printing control section 206 controls the printing speed of the printing mechanism section on the basis of the creation speed of image data in the image expansion section 204.

With this configuration, the printer 2 controls the printing speed on the basis of the creation speed when data input from the host computer 4 is expanded to create image data for printing. Thus, it is possible to harmonize the speed of processing related to the expansion of data which is likely to be high-load processing and the speed of printing based on expanded image data and to prevent interruption of the printing operation due to the expansion processing of data being unfinished on time. The creation speed of image data reflects both the input speed of data from the outside and the speed of the expansion processing of data. Thus, the printing speed is controlled on the basis of the creation speed of image data, reliably preventing interruption of the printing operation. There is little limitation on the capacity of the buffer memory, and the printing speed can be appropriately controlled.

The image expansion section 204 of the control section 20 creates image data and outputs created image data to the image buffer 205 in the prescribed job unit. The printing control section 206 controls the printing speed on the basis of the job receiving interval at which the jobs are output from the image expansion section 204 to the image buffer 205. Thus, the image expansion section 204 easily and accurately detects the speed at which data is expanded to create image data, appropriately controlling the printing speed in accordance with the speed. The printing speed is changed in accordance with the job receiving interval, such that the printing speed is increased within a range in which image data is unlikely to be depleted, improving throughput. The printing speed is controlled so as not to exceed the creation speed of image data, preventing interruption of the printing operation and performing stable printing.

The printing speed is determined without depending on the residual quantity of image data stored in the image buffer 205. Therefore, it is possible to appropriately set the printing speed regardless of the capacity of the image buffer 205, preventing depletion of image data.

The image expansion section 204 outputs created image data to the image buffer 205 in units of a job corresponding to one row of characters or the like, or one dot line of a graphic or the like, and controls the printing speed on the basis of the job receiving interval. Therefore, it is possible to adjust the printing speed meticulously and to continue a stable recording operation. The job unit may be one row of characters or the like, or one dot line of a graphic or the like.

The above-described embodiment is a specific example to which the invention is applied, and is not intended to limit the invention. For example, although in the above-described embodiment, an example has been described where the image expansion section 204 outputs image data in units of a job having data of characters of one row or a graphic of one dot line, the invention is not limited thereto. Image data may be output to the image buffer 205 with a predetermined number of dots set as one job without differentiating between characters and graphics. There is no limitation on the quantity of data constituting a job. The quantity of data constituting a job may be appropriately set in accordance with the size of the image expansion section 204 in the printer 2 or the speed at which image data is consumed at the time of printing.

The invention can be applied to any recording apparatus insofar as a printer can control the recording speed on the recording medium. In particular, the invention can be suitably applied to a line printer in which the printing speed can be controlled on the basis of the creation speed of image data for each line. For example, a dot impact type printer, an ink jet type printer, a thermal sublimation type printer, and the like may be exemplified in which recording is performed by using a carriage reciprocatively scanning perpendicularly to the transport direction of the recording medium and a recording head mounted on the carriage. The invention can be applied to when image data is processed in a page unit. The invention can be applied to an ink jet type printer or a laser printer in which printing is performed in a page unit. The invention can be applied to a printer which is incorporated into another apparatus, and the apparatuses to which the invention is applied are not limited.

The processing of the control section or the like of the recording apparatus of the above-described embodiment can be provided as a program. The program may be provided through a computer-readable recording medium (a hard disk, an optical disk, a magneto-optical disk, a flash memory, or the like) storing the program.

What is claimed is:

1. A recording control device that controls a recording mechanism section which performs recording on a recording medium by a recording head, the recording control device comprising:
   an image expansion section that expands data input from an outside source to create image data for recording in prescribed job units of at least one row or at least one dot line to be recorded, and outputs the image data in said job units;
   an image buffer memory that receives and temporarily stores the job units output from the image expansion section, wherein a time span from a most-previously received job unit to a currently received job unit constitutes a job-receiving-interval that corresponds to the currently received job unit; and
   a recording control section that reads the job units stored in the image buffer memory, and controls the recording mechanism section to record the read job units on the recording medium by the recording head;
   wherein for each read job unit, the recording control section controls a recording speed of the recording mechanism section in accordance with a creation speed of each read job unit by the image expansion section as determined from each read job unit's corresponding job-receiving-interval.

2. The recording control device according to claim 1, wherein when the recording control section increases or decreases the recording speed of the recording mechanism section at the time of recording of each read job unit by a predetermined amount or more with respect to the recording speed of the recording mechanism section at the time of recording of a most-previously read job unit, the recording control section increases or decreases the recording speed of the recording mechanism section from the recording speed at the time of recording of the most previously read job unit.

3. A recording apparatus comprising:
   a recording mechanism section having a recording head which performs recording on a recording medium;
   an image expansion section that expands data input from an outside source to create image data for recording in prescribed job units of at least one row or least one dot line to be recorded, and outputs the image data in said job units;

an image buffer memory that receives and temporarily stores the job units output from the image expansion section, wherein a time span from a most-previously received job unit to a currently received job unit constitutes a job-receiving-interval that corresponds to the currently received job unit; and a recording control section that reads the job units stored in the image buffer memory, and controls the recording mechanism section to record the read job units on the recording medium by the recording head;

wherein for each read job unit, the recording control section controls a recording speed of the recording mechanism section in accordance with a creation speed of each read job unit by the image expansion section as determined from each read job unit's corresponding job-receiving-interval.

4. The recording apparatus according to claim 3, wherein when the recording control section increases or decreases the recording speed of the recording mechanism section at the time of recording of each read job unit by a predetermined amount or more with respect to the recording speed of the recording mechanism section at the time of recording of a most-previously read job unit, the recording control section increases or decreases the recording speed of the recording mechanism section from the recording speed at the time of recording of the most-previously read job unit.

5. A method of controlling a recording apparatus that controls a recording mechanism section which performs recording on a recording medium by a recording head, the method comprising:

expanding data input from an outside source to create image data for recording in prescribed job units of at least one row or at least one dot line to be recorded;

outputting the created image data in said job units;

receiving and temporarily storing the output job units in an image buffer memory, wherein a time span from a most-previously received job unit to a currently received job unit constitutes a job-receiving-interval that corresponds to the currently received job unit;

reading the job units stored in the image buffer memory; and recording the read job units on the recording medium by the recording head;

wherein for each read job unit, a recording speed of the recording mechanism section is controlled in accordance with a creation speed of each read job unit as determined from each read job unit's corresponding job-receiving-interval.

6. The method according to claim 5, wherein in the controlling, when the recording speed of the recording mechanism section at the time of recording of each read job unit is increased or decreased by a predetermined amount or more with respect to the recording speed of the recording mechanism section at the time of recording of a most-previously read job unit, the recording speed of the recording mechanism section at the time of recording of the most-previously read job unit is increased or decreased.

7. A non-transitory computer-readable recording medium that records a program therein, the program causing a controller for controlling a recording mechanism section which performs recording on a recording medium by a recording head to execute the method according to claim 5.

8. The recording control device according claim 1, wherein the time span is compared with a multiple-stage threshold value set, a range to which the time span belongs is determined, and the creation speed of the read job unit corresponding to the determined range is obtained.

9. The recording apparatus according to claim 3, wherein the time span is compared with a multiple-stage threshold value set, a range to which the time span belongs is determined, and the creation speed of the read job unit corresponding to the determined range is obtained.

10. The method according to claim 5, wherein the time span is compared with a multiple-stage threshold value set, a range to which the time span belongs is determined, and the creation speed of the read job unit corresponding to the determined range is obtained.

* * * * *